(12) United States Patent
Hao et al.

(10) Patent No.: US 6,377,287 B1
(45) Date of Patent: Apr. 23, 2002

(54) TECHNIQUE FOR VISUALIZING LARGE WEB-BASED HIERARCHICAL HYPERBOLIC SPACE WITH MULTI-PATHS

(75) Inventors: Ming C. Hao, Palo Alto; Meichun Hsu, Los Altos Hills; Umeshwar Dayal, Saratoga, all of CA (US); Adrian Krug, Langenfeld (DE)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/294,542

(22) Filed: Apr. 19, 1999

(51) Int. Cl.[7] ................................................. G06F 3/14
(52) U.S. Cl. ...................................... 345/853; 345/854
(58) Field of Search ................................ 345/839, 841, 345/781, 744, 804, 853, 854, 734

(56) References Cited

U.S. PATENT DOCUMENTS

| 5,694,591 A | | 12/1997 | Du et al. | |
| 5,864,865 A | | 1/1999 | Lakis | |
| 5,878,421 A | * | 3/1999 | Ferrel et al. | 707/100 |
| 5,910,803 A | * | 6/1999 | Grau et al. | 345/357 |
| 6,072,490 A | * | 6/2000 | Bates et al. | 345/357 |

* cited by examiner

Primary Examiner—Cao H. Nguyen (57) ABSTRACT

A system and a method in accordance with the invention utilize hidden links, mapping and unmapping to enable single-screen visualization of hyperbolic space with multiple path links. In the preferred embodiment, the hyperbolic space is a display of a tree structure having nodes in which each child node has a single primary parent that is linked to the child node by a primary path. The nodes also include secondary paths. The system includes a multi-path processor that is used to manage three basic processing elements. As a first element, a multi-path property is added to each child node to indicate whether the child node has at least one secondary path in addition to its primary path. As a second element, an examiner checks each child node's multi-path property when a user focuses on that child node. If the node has at least one secondary path, the multi-path processor invokes the proper actions, such as mapping and unmapping. A third processing element is the mapper/unmapper which simultaneously maps and unmaps the secondary sub-tree nodes that are associated with the secondary path. Following the navigation of the secondary path, the multi-path processor reverses the operations, unmapping the sub-tree nodes and restoring the nodes to the original tree structure, simultaneously restoring the nodes.

17 Claims, 8 Drawing Sheets

TECHNIQUE FOR VISUALIZING LARGE WEB-BASED HIERARCHICAL HYPERBOLIC SPACE WITH MULTI-PATHS

TECHNICAL FIELD

The invention relates generally to navigating within large hyperbolic space and more particularly to methods and systems for reducing the display cluttering and complexity of navigating within large hierarchies such as organizational charts or Internet resources.

BACKGROUND OF THE INVENTION

Recently, there has been substantial research focused on visual mining of large hierarchies of nodes, such as the World Wide Web structure, organization charts, and file systems, using a hyperbolic tree space. For example, in Web data mining, there is an immediate need for users to visualize the content and usage of the Web. How to navigate through millions of documents to access information on one display is a problem which needs to be solved. Hyperbolic space provides an elegant solution to displaying large hierarchies on a user screen. Hyperbolic space is different from the conventional approaches of laying trees on an Euclidean space. In Euclidean space, the area of a circle which contains nodes grows linearly. In hyperbolic spaces, the area of a circle grows exponentially with respect to its radius. As a result, known approaches using hyperbolic space can handle a graph of over 20,000 documents on the Web, using a focus-and-context scheme.

Hyperbolic space allows a user to navigate through the nodes of a large hierarchy and to view the relationship of the visible portion of the space to the entire structure on a single display. This is an improvement over techniques in which multiple displays are required to represent a large amount of data sets, with the user having to click through display after display in order to find the information that is needed.

In a directed hierarchical hyperbolic tree, nodes are organized along parent and child relationships. A parent can have many children. A child can have only one parent. For example, in an organization chart hyperbolic tree, each employee reports to one manager. A manager may have many employees. However, in practice this may not be sufficient, since an employee may report to two managers (e.g., one regular manager and one temporary project manager). Thus, two paths may be needed, one for the regular manager and the other for the temporary project manager.

In a customer support application, a hyperbolic tree may be used to organize large numbers of questions and answers in a hierarchical structure. Questions are parent nodes, while answers are arcs (pointers) to child nodes. A question can have several answers. An answer can lead to more questions and answers. However, it is sometimes necessary for an answer to link to another question-and-answer group (sub-tree) which does not directly belong to the hierarchical hyperbolic space.

In a directed non-cyclic hierarchical hyperbolic space, a node (except for a root node) has exactly one primary parent. If a node has more than one parent, then exactly one is designated as the "primary parent" and the others are referred to as "secondary parents." The link from a node's secondary parent to the node is referred to as a "secondary path." The path from a node's primary parent to the node is referred to as the "primary path." For example, the path to the regular manager is a direct hierarchical link, called the primary path. The path to the temporary project manager is a directed non-hierarchical link, called the secondary path. A node which serves as a multi-path node contains both the primary path and the secondary path.

In the above examples, a secondary path is needed to represent the relationship between the employee and the employee's temporary project manager or to relate a particular answer with other question-and-answer groups. A concern is that strict hierarchical tree structures are too restrictive, since often a relationship needs to link different branches of the tree. Commercially available hyperbolic tree implementations do not support such secondary paths. One solution would be to depict the secondary relationships with additional lines. However, this solution could introduce thousands of lines and intersections, as will be explained with reference to FIG. 1, which includes only primary relationships, and FIG. 2, which includes both primary and secondary relationships. Also, for far away nodes that are off the screen, it would introduce "broken" lines that do not terminate in a node on the current display. As a result, the hyperbolic space becomes very cluttered and difficult to visualize.

Figure 1:
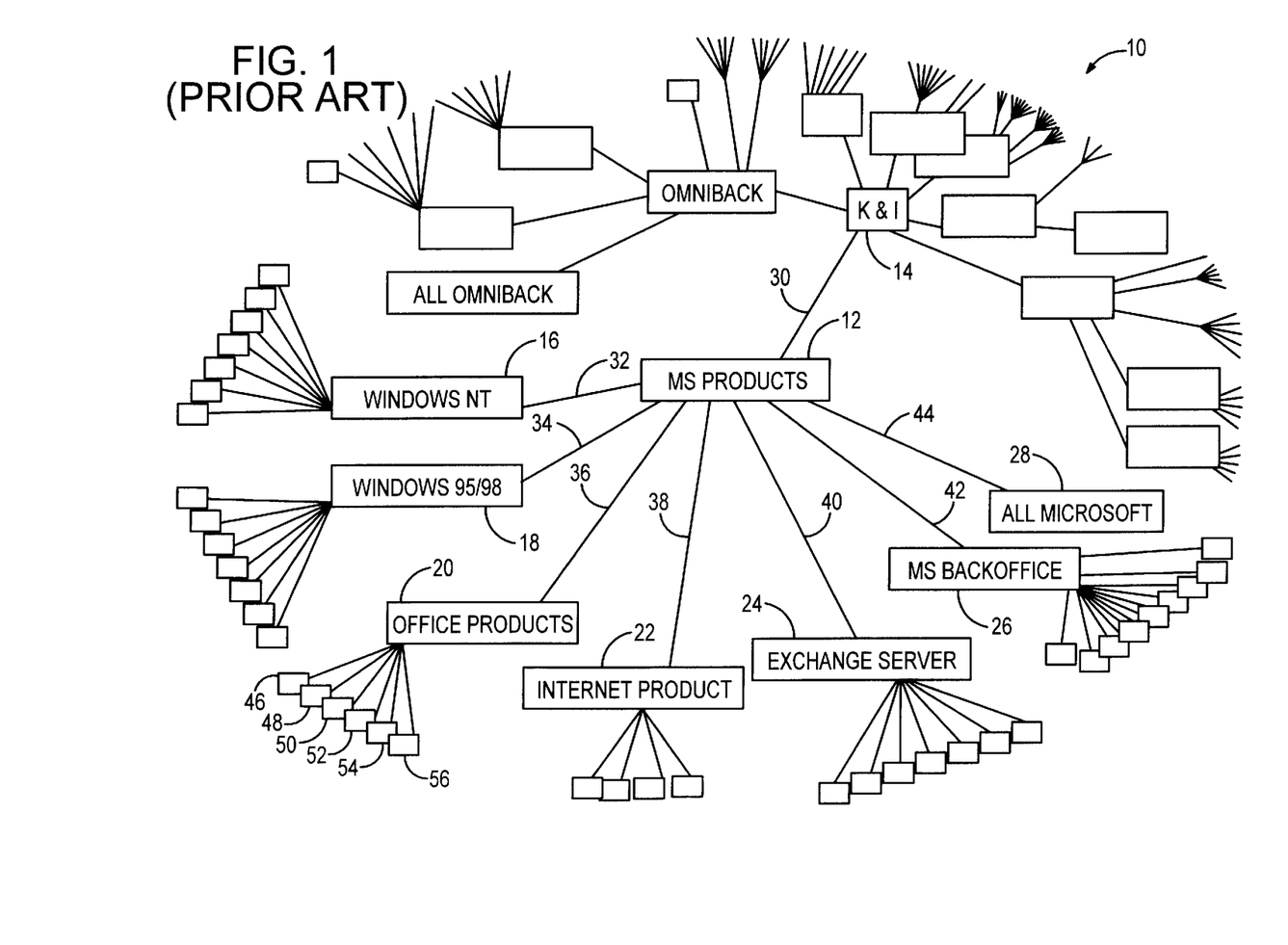
FIG. 1 is a graph of a hyperbolic tree with only primary paths in accordance with the prior art.

With reference to FIG. 1, a conventional tree structure 10 is shown as having a root node 12 that is labeled "MS PRODUCTS." The root node includes eight child nodes 14, 16, 18, 20, 22, 24, 26 and 28 that are connected to the parent node by edges (i.e., primary paths) 30, 32, 34, 36, 38, 40, 42 and 44, respectively. Each of the child nodes is the parent node to at least one other node. For example, the child node 20 labeled "OFFICE PRODUCTS" is the parent node for six other nodes 46, 48, 50, 52, 54 and 56 that are connected to the node 20 by primary paths. In the hyperbolic space, the far away nodes and edges are diminished when the user is not focusing on them. These nodes will reappear when the user warps the display to focus on or near them. The user can dynamically warp the display to focus on thousands of different nodes for navigation. The conventional tree of FIG. 1 is a non-cyclic hierarchical hyperbolic structure without secondary paths. Thus, the structure will include n nodes and n−1 edges.

Figure 2:
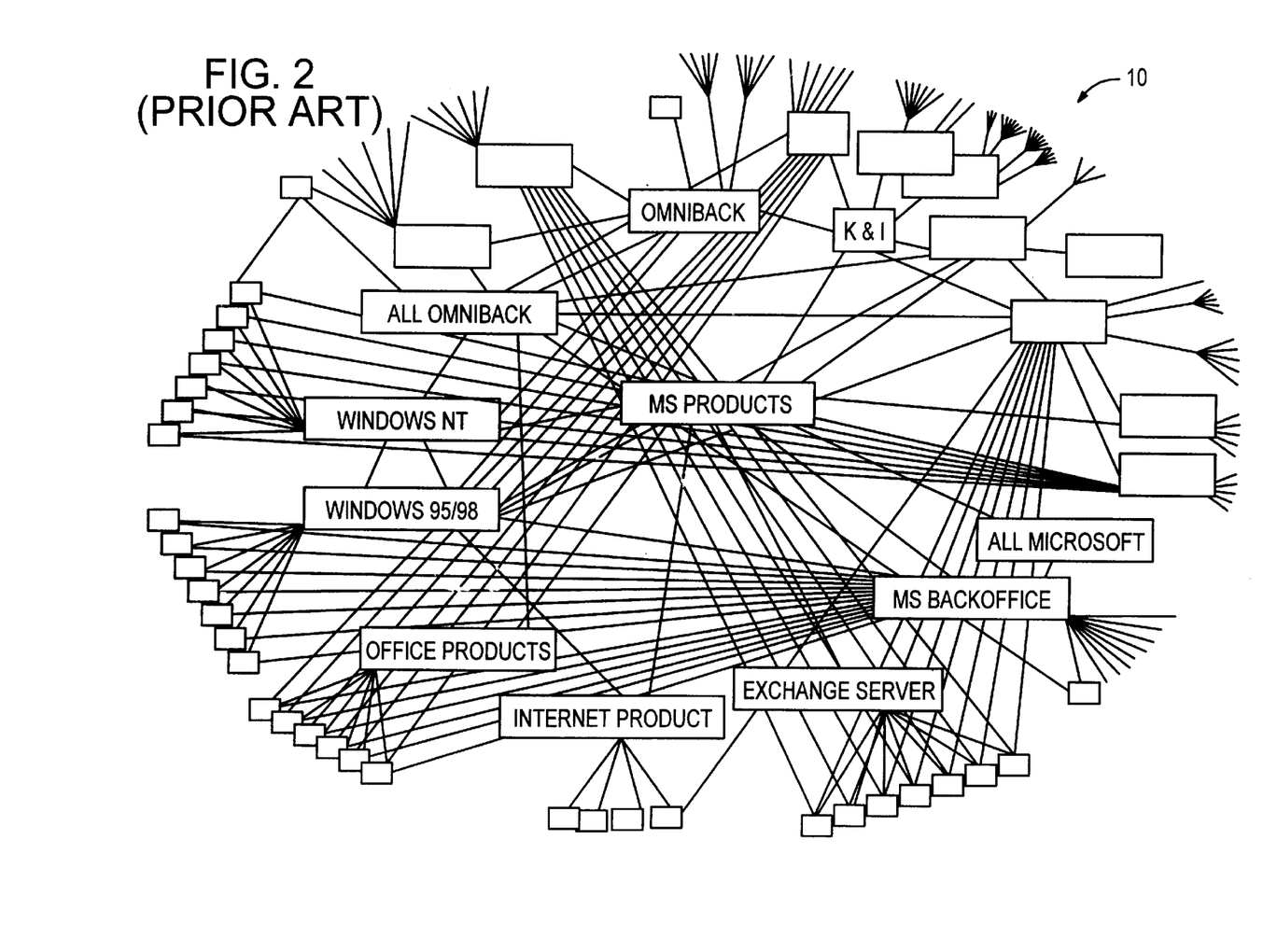
FIG. 2 is a graph of the hyperbolic tree of FIG. 1, but includes secondary paths in addition to the primary paths.

FIG. 2 is an illustration of the same tree, but with secondary paths in addition to the primary paths. The multi-path hyperbolic tree includes numerous lines and intersections. There are also many broken lines. As can be seen, the hyperbolic tree becomes very cluttered. The cluttering is increased if additional secondary paths are necessary in order to show all of the relationships. In the illustration of FIG. 2, there are n nodes, n−1 primary edges and numerous secondary edges and intersections.

What is needed is a system and method for visualizing and navigating through a complex hyperbolic space with multiple paths, such as a web-based hyperbolic space, while preserving the simplicity of nodes organized along parent and child relationships.

SUMMARY OF THE INVENTION

A system and a method in accordance with the invention utilize hidden links, mapping, and unmapping to enable single-screen visualization of a directed non-cyclic hyperbolic space with multiple path links. The hidden links technique hides all of the secondary paths in each node's property at the time that the hyperbolic space is initialized. The nodes to which a secondary path are pointed become accessible and interactive via the secondary path only at the time of focus upon portions of the hyperbolic space related to the secondary path. The user can easily navigate through all possible paths without tracing many lines and intersections.

In the preferred embodiment, the hyperbolic space is organized in a directed non-cyclic hierarchical space. Thus, there is a primary graph which links all of the nodes in a tree form that follows the one parent per child convention. These links are primary tree links. However, there are also secondary links that define a highly connected graph. A node in the hierarchy can have one incoming primary link (i.e., one link from a primary parent node) and may have many secondary links. The secondary paths are hidden at the time that the hyperbolic space is initialized.

A "primary path" is defined herein as a tree link. Preferably, it is a directed non-cyclic graphic link in a hierarchical hyperbolic space. With the exception of a root node, each node has one primary parent, with the link from a node's primary parent to that node being the primary path. A "secondary path" is defined as a link in which additional (i.e., secondary) parents are defined. The link from a node's secondary parent to that node is a secondary path. A "hidden-link node" (as referred to as a "multi-path node") is defined as a node that contains both primary and secondary paths. "Primary sub-tree nodes" (also referred to as "primary sub-space nodes") are used herein to define the relationship between a sub-space parent node and its child nodes linked to the tree by a primary path. "Secondary sub-tree nodes" (also referred to as "secondary sub-space nodes") are used herein to define a relationship between a sub-space parent node and its child nodes linked to the tree by a secondary path.

A multi-path processor is used to manage three basic processing elements. As a first element, a multi-path property is added in each child node to indicate whether the node has at least one secondary path in addition to its primary path. As a second element, an examiner checks each child node's multi-path property when a user focuses on the node. If a node has at least one secondary path, the multi-path processor invokes the concurrent actions, such as mapping and unmapping. The third processing element is the mapper/unmapper which simultaneously maps and unmaps the secondary sub-tree nodes. Following the navigation of a secondary path, the multi-path processor reverses the operations, unmapping the sub-tree nodes and restoring the node to the original structure.

By operation of the multi-path processor, five different states are defined during navigation that includes a secondary path. In an idle state, the hyperbolic space with multi-path links has the same layout as it would have without the multi-paths. That is, the secondary paths are transparent to the user, so that there are no extra lines and intersections within the graph. An activate state is triggered by identification of a multi-path node by a user. Preferably, the multi-path nodes are visually distinguishable from nodes which do not include secondary paths. When the user identifies a particular multi-path node, one or more temporary secondary path nodes will be drawn from that node. The user can dynamically select one of the secondary path nodes for further navigation.

The third state is a map/unmap state (i.e., move state). The processor uses parallel mapping and unmapping methods to move the selected secondary sub-tree nodes from their original position in the tree structure to a position that reflects the relationship with the identified multi-path node. Thus, a new hyperbolic space is created. The mapping and unmapping operations are concurrently executed, with a navigation state being enabled only after both operations are completed. In a navigation state, the mapped secondary sub-tree nodes are browsed and navigated in a simplified hyperbolic space. Finally, at the end of the navigation of the secondary sub-tree nodes, the sub-tree nodes are returned to their original positions within the tree structure. The reset state may be triggered by departure of a user from further navigation of the secondary sub-tree (i.e., an "unfocus" on the secondary sub-tree) or by the user pressing a reset button.

DETAILED DESCRIPTION

Figure 3:
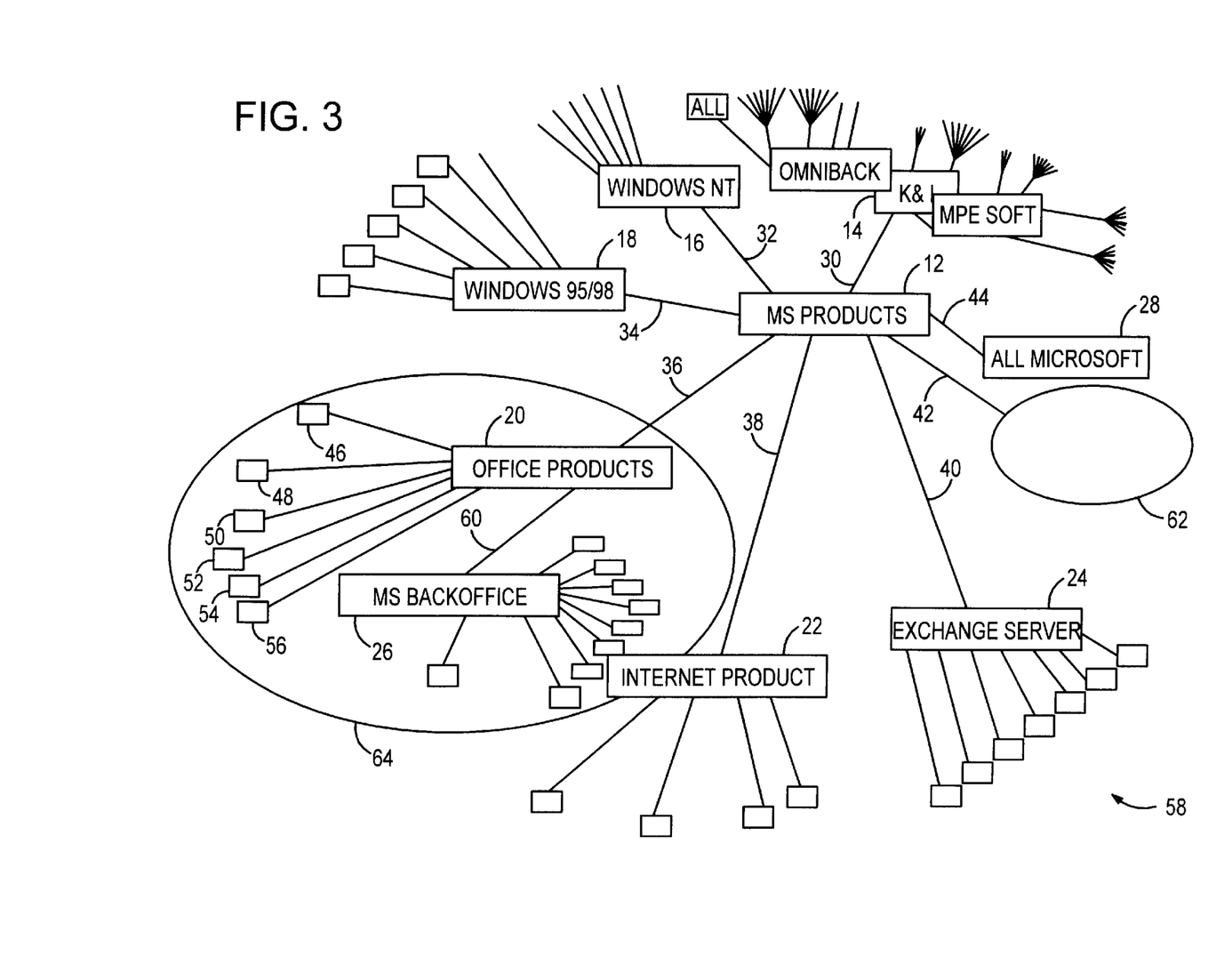
FIG. 3 is a graph of the hyperbolic tree of FIG. 2, following use of hidden link, mapping and unmapping techniques in accordance with the invention.

With reference to FIG. 3, a hierarchical hyperbolic tree having hidden secondary links is shown as having a modified tree structure as a result of simultaneously mapping and unmapping in accordance with the techniques to be described below. The mapping and unmapping techniques are applied to the hyperbolic space having both primary paths and secondary paths. The reference numerals that were used in FIG. 1 are duplicated in FIG. 3 for equivalent nodes and equivalent primary and secondary paths. The node 20 that is labeled as "OFFICE PRODUCTS" is a multi-path node having a secondary path link to node 26, which is labeled "MS BACKOFFICE." In FIG. 3, the MS BACKOFFICE node has been moved by unmapping the node from its primary path 42 (as indicated by oval 62) and mapping the node and its child nodes to the secondary path 60 (as indicated by oval 64).

At its original hierarchical position indicated by oval 62, the MS BACKOFFICE node 26 and its child nodes formed a primary sub-tree, since the nodes were linked to the hyperbolic space by the primary path 42. However, in the position shown in FIG. 3, the same nodes are secondary sub-tree nodes, since they are linked to the OFFICE PRODUCTS node 20 by the secondary path 60. The modification to the hyperbolic space is triggered by an indication from the user that he or she is ready to navigate the secondary sub-tree. This indication may be implemented using any of known means of focusing upon nodes in hyperbolic space. For example, a computer mouse may be used to "click" on a particular node.

An advantage of the techniques of providing hidden links, mapping and unmapping is that the simplicity of the original hyperbolic space is retained, while secondary paths are accommodated. That is, secondary paths may be defined without adding a complexity of extra lines and intersections. At the end of navigation through a sub-tree, the hyperbolic space is returned to its original format, so that there are n nodes and n−1 edges.

Figure 4:
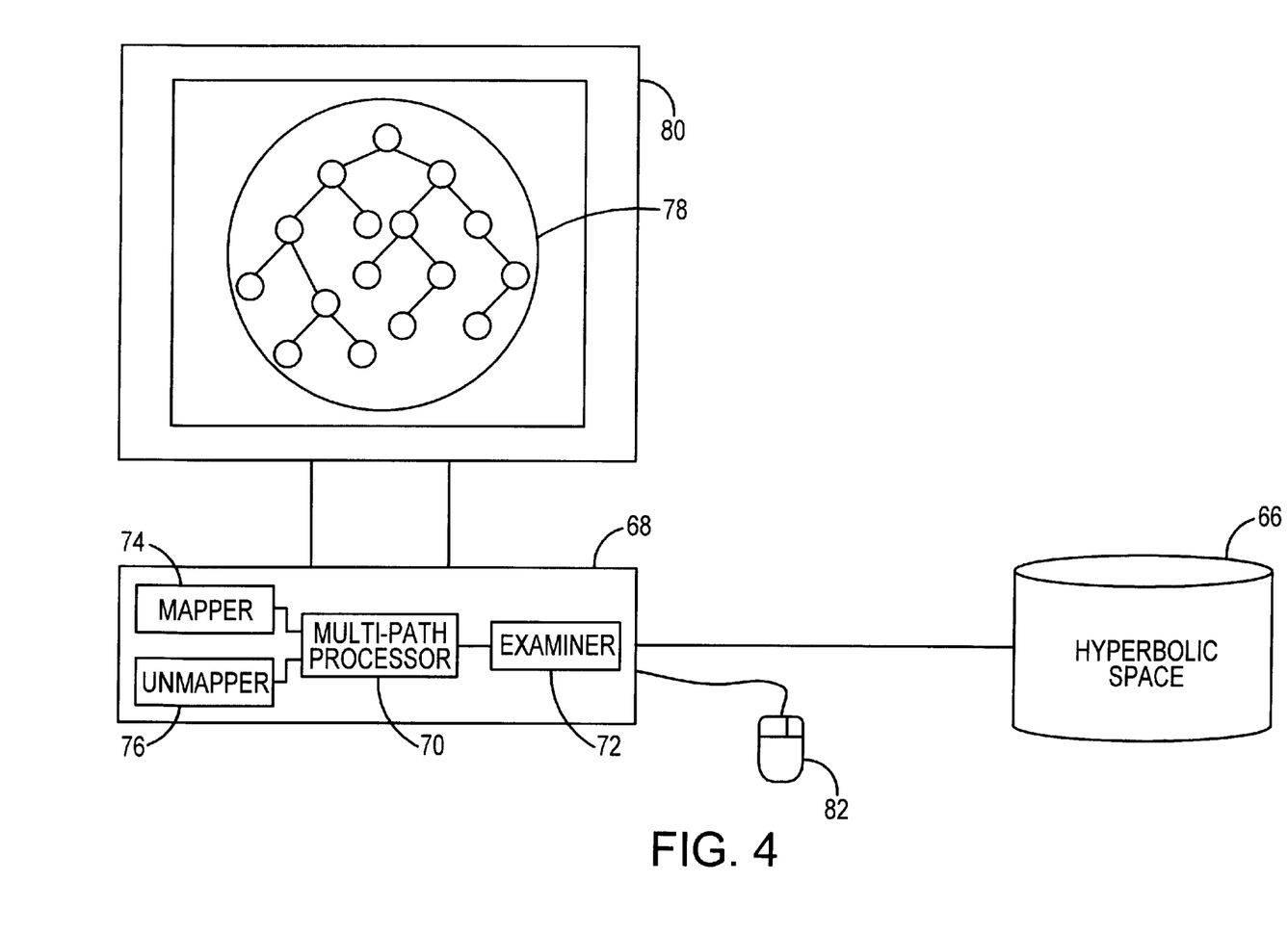
FIG. 4 is a block diagram of a system for manipulating multi-path hyperbolic space using hidden link mapping and unmapping techniques in accordance with the invention.

Referring now to FIG. 4, a system for providing dynamic hidden links is shown as having memory 66 that stores the hyperbolic space. The memory may be internal or external memory of a personal computer 68. In additional to conventional components, the computer 68 includes a multi-path processor 70, an examiner 72, a mapper 74 and an unmapper 76. The additional components enable techniques that provide multi-paths (i.e., both primary and secondary paths) in a hyperbolic space (both hierarchical and non-hierarchical) to be accessible and interactive. A user can easily navigate through all possible primary and secondary paths without drawing extra lines and intersections. This allows multiple paths defined in each node's property. For example, when a user clicks on a child node that has a secondary path (e.g., a link from an employee to both a regular manager and a temporary project manager), the processing automatically maps and unmaps the secondary sub-tree nodes to the temporary manager for the uncomplicated navigation by the user. In FIG. 4, an example of a hyperbolic hierarchical space 78 is shown on the screen of a monitor 80.

The multi-path processor 70 is used to manage three basic processing elements. The first processing element is to add a new property to each child node to indicate whether that node has secondary paths to other nodes in addition to its primary path. As a second processing element, the examiner 72 checks the property of each child node when the user identifies a node, such as by "clicking" on the node by means of a computer mouse 82. If the examiner determines that the node is a multi-path node, the multi-path processor 70 immediately invokes the proper actions, such as simultaneously mapping and unmapping. The third basic processing element is the concurrent mapping and unmapping of the selected secondary sub-tree. At the end of the secondary path navigation, the multi-path processor reverses the above operations. That is, the sub-tree nodes are unmapped and restored to their original position within the hyperbolic hierarchical space 78.

Figure 5:
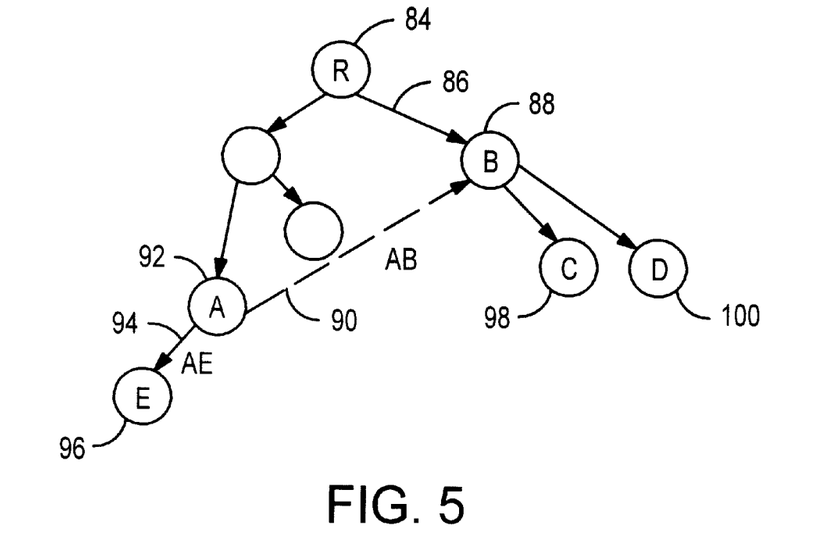
FIG. 5 is an example of a hierarchical hyperbolic tree having hidden secondary paths in accordance with the invention.

In the preferred embodiment, the mechanism is built on a Web-based, client-server model with multi-threaded parallelism. This mechanism interacts with the user and hyperbolic tree engines to allow instantaneous mapping and unmapping of secondary sub-trees for information visualization in a hyperbolic tree structure. Definitions relevant to the mechanism will be described with reference to FIG. 5. A "primary path" is a directed non-cyclic graphic link in a hierarchical hyperbolic space from a primary parent to a child node. With the exception of a root node 84, every node has exactly one primary parent, with a link to that node from its primary parent being the primary path. The link 86 from the root node 84 to the B node 88 is a primary path. Another primary path shown in FIG. 5 is the AE path 94 from the A node 92 to the E node 96. The primary paths may be referred to as tree links.

A "secondary path" is formed when a node has more than one parent. One of the parents is a secondary parent, with the link between the two nodes being a secondary path. In FIG. 5, the link AB is a secondary path between nodes 88 and 92.

A "hidden link node" is one that includes both primary and secondary paths to other nodes. The A node 92 is a hidden link node, since it has a primary path 94 to node 96 and a secondary path 90 to node 88. A hidden link node is also referred to as a "multi-path node." "Primary sub-tree nodes" are portions of the tree formed by a parent node and its child nodes linked to the tree by primary paths. For example, the A node 92 and the child node 96 are linked by the primary path 94, so the pair of nodes 92 and 96 are primary sub-tree nodes. Primary sub-tree nodes are also referred to as "primary sub-space nodes."

"Secondary sub-tree nodes" are formed by a parent node and its child nodes linked to the tree by a secondary path. In FIG. 5, the node B 88 and its child nodes (i.e., the C node 98 and the D node 100) are linked to the A node 92 by the secondary path 90, so the nodes 88, 98 and 100 are secondary sub-tree nodes. Secondary sub-tree nodes are also referred to as "secondary sub-space nodes."

In the directed non-cyclic hierarchical hyperbolic space, each node has exactly one primary parent, other than the root node 84. If a node has more than one parent, then exactly one is designated as the primary parent, and the others are referred to as secondary parents. As a result of the above-stated definitions, the link from a node's secondary parent to the node is referred to as the secondary path. The path from the node's primary parent to the node is referred to as the primary path. For example, the path from the regular manager of an employee is a primary path, while the path from the temporary project manager of the employee is the secondary path. A node which serves as a hidden link node contains both the primary path and the secondary path.

Figure 6:
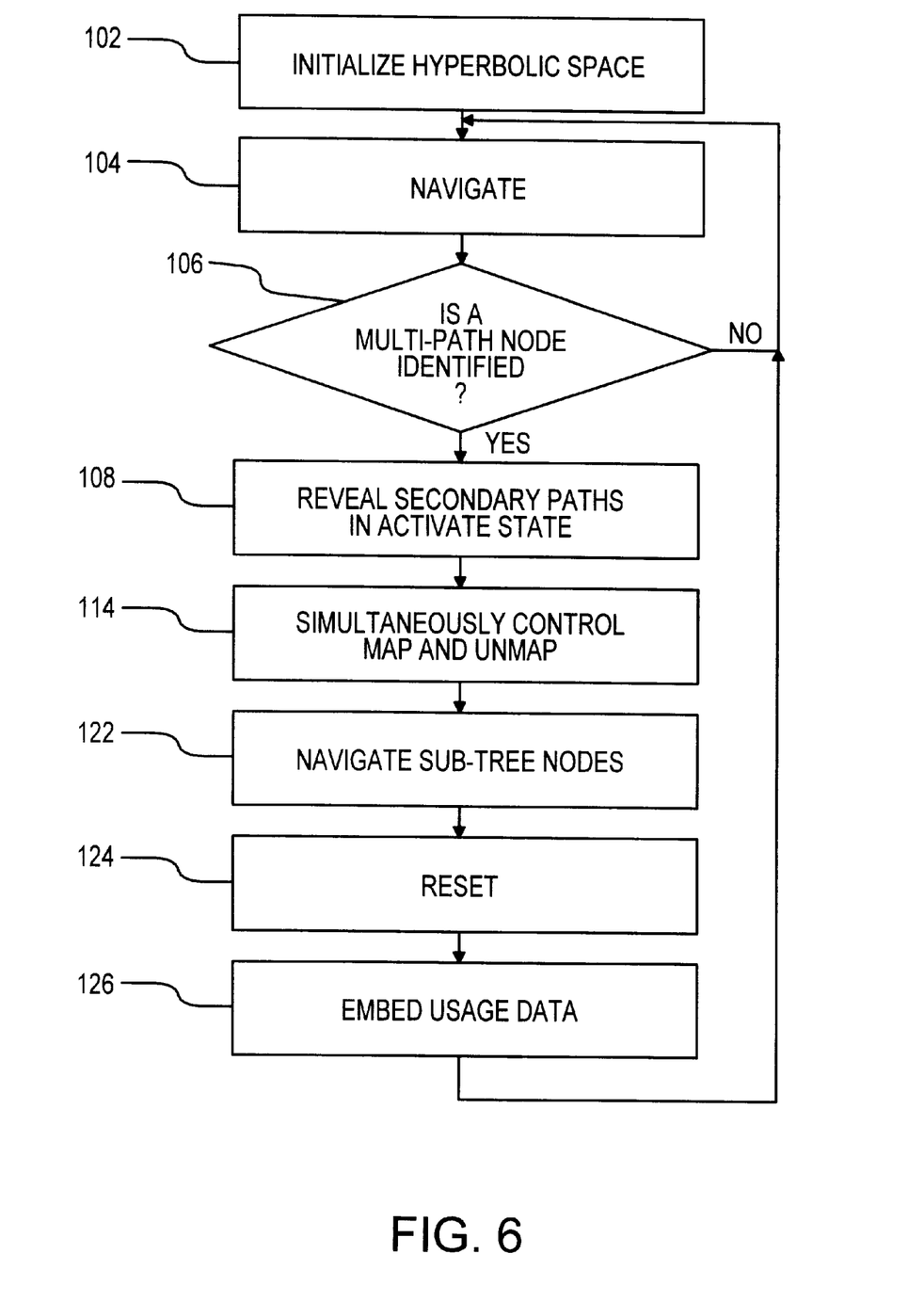
FIG. 6 is a process flow of steps for implementing the techniques that are enabled by the system of FIG. 4.
Figure 7:
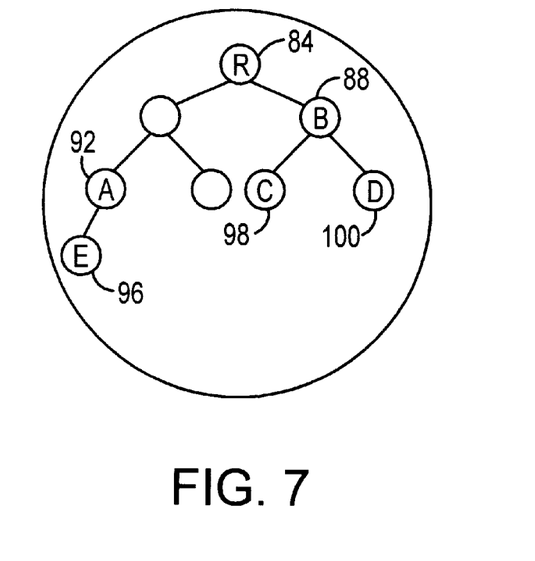
FIG. 7 is the hierarchical hyperbolic tree of FIG. 5 in an idle state.

Referring now to FIG. 6, a process flow of steps for utilizing the invention begins with a step 102 of initializing the hyperbolic space. The hidden link property is defined at this step. The secondary links are transparent to the user, so that there are no extra lines and intersections in the graph. However, a multi-path node may be distinguished by color or by other means known in the art. FIG. 7 is a representation of the small-scale hyperbolic space of FIG. 5, with the secondary path 90 being hidden. Thus, the hyperbolic space is in an "idle state."

Figure 8:
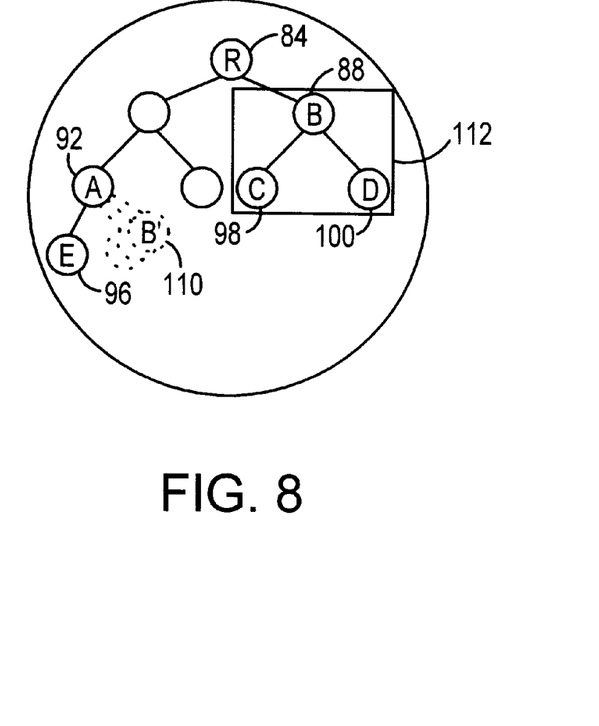
FIG. 8 is the hyperbolic tree of FIG. 5 in an activate state.

In step 104, the nodes are navigated. In the decision step 106, a determination is made as to whether an identified node is a multi-path node. Referring briefly to FIG. 4, the examiner 72 is utilized in this step. If an identified node is not a multi-path node (i.e., a hidden link node), the process continues to navigate in step 104. However, if a multi-path node is identified, secondary connections are revealed in an "activate state," as shown in step 108. For example, if a user employs the computer mouse 82 of FIG. 4 to click on the multi-state node 92 of FIG. 7, a number of secondary path nodes may be drawn from that node. The resulting activate state is shown in FIG. 8. One of the temporary secondary nodes 110 represents the secondary path to the B node 88. The secondary sub-tree nodes that are affected by the secondary path are represented in a box 112.

Figure 9:
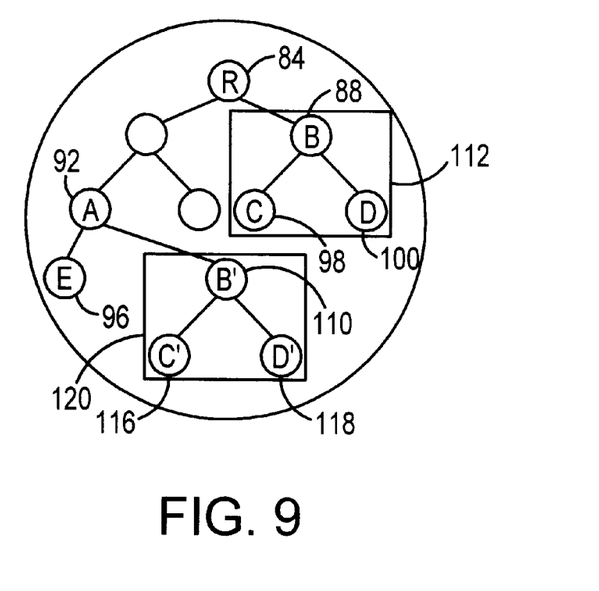
FIG. 9 is the hyperbolic tree of FIG. 5 in a map/unmap state.

If the user focuses upon the temporary secondary path node 110 of FIG. 8, the mapping and unmapping procedures are implemented by the mapper 74 and unmapper 76 of FIG. 4. The operations are simultaneously controlled in step 114 of FIG. 6. While the two operations are executed simultaneously, the next state (i.e., the navigation state) is enabled only after both operations are completed. Consequently, the hyperbolic space is modified without adding complexity to the graph. In FIG. 9, a "map/unmap state" is represented. The nodes 88, 98 and 100 within box 112 are unmapped and nodes 110, 116 and 118 within box 120 are mapped. As a result, the secondary sub-tree of box

120 is shown as having a link to A node 92. The secondary sub-tree nodes are moved from their original structure to the connection with the multi-path node 92.

Figure 10:
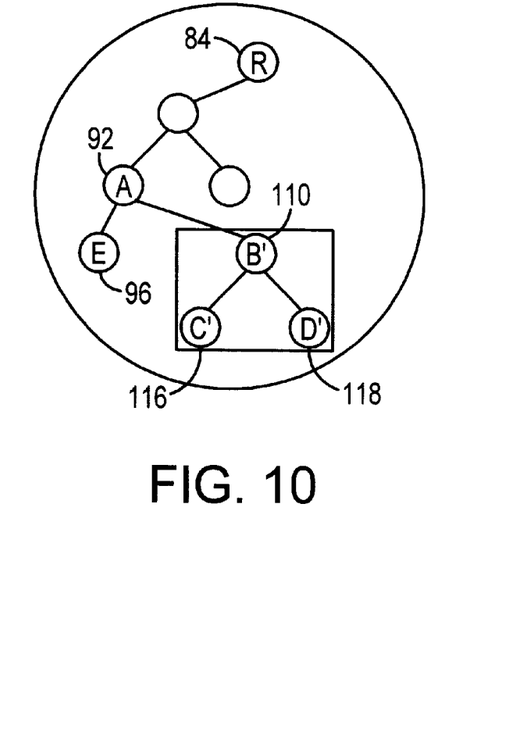
FIG. 10 is the hyperbolic tree of FIG. 5 in a navigation state.

After the selected secondary sub-tree nodes have been mapped under the multi-path node 92, the user can begin to browse and navigate through the secondary sub-tree, as indicated in step 122 of FIG. 6. The resulting "navigation state" is represented in FIG. 10. At the end of navigation, the multi-path processor unmaps the secondary sub-tree of nodes 110, 116 and 118 from connection with the A node 92. Simultaneously, the processor maps the primary sub-tree node B and its child nodes C and D back to its original structure. That is, the structure is reset at step 124 of FIG. 6. The hyperbolic space with the secondary sub-space and its child nodes only exists during the secondary path processing. Preferably, the ancestors of the multi-path node are checked to prevent cyclic mapping of the secondary path. The reset step 124 of FIG. 6 establishes the "reset state" of FIG. 11. The reset may be triggered by removal of the navigation focus from the secondary sub-tree or by other known means, such as user depression of a "reset" button to restore the original hyperbolic structure.

Figure 11:
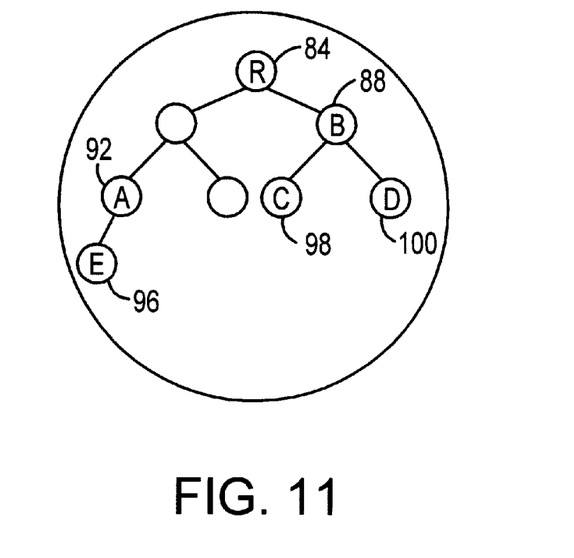
FIG. 11 is the hyperbolic tree of FIG. 5 in a reset state.

In the preferred embodiment, the processing includes a step 126 of embedding usage data into the representation of FIG. 11. That is, statistical data regarding usage of the hyperbolic space (e.g., user navigation through the hierarchy) is compiled and embedded into the presentation to the user. For example, the frequency of navigation through the branches of the hyperbolic structure may be indicated by color coding the paths between nodes or by color coding the nodes themselves. The embedded usage data provides the user with additional information to more effectively navigate through the nodes. For example, the user may choose not to navigate through a branch which has previously rarely been navigated.

In the utilization of the above-identified invention, a Web browser with Java activator may be used to dynamically create a large hyperbolic space on the Web. The visualization Web interfaces are standard HTML and Java applets, which are used to explore relationships and to retrieve data within a region of interest. A server is integrated with a mining engine and a data warehouse that stores the information for the large hyperbolic space. The user is put in control at the client end of the Web-based, client-server model in order to mine the knowledge results. The process also allows the user to dynamically access large hierarchies with complex links through HTML pages in a Web browser. There are also other data mining applications with large hierarchical information structure that can be mapped into hyperbolic spaces with hidden secondary paths in accordance with the invention.

An advantage of the invention is that it retains visualization of large hierarchical hyperbolic space with multi-paths, but without the clutter of extra lines and intersections. The method and the system provide encapsulation mechanisms without modifying existing hyperbolic engines. Concurrent mapping and unmapping methods are triggered only during processing. As a result, large hierarchies with multi-paths are effectively visualized on a single computer monitor. Color coding may be used to identify nodes with both primary and secondary paths. Another advantage is that ancestors of the multi-path nodes are checked to prevent processing cycles.

What is claimed is:

1. A method of navigating nodes comprising steps of:
    providing data that defines a tree structure in which said nodes are organized according to primary paths that form tree links, said data further defining secondary paths among said nodes, nodes having both primary and secondary paths being multi-path nodes;
    displaying said tree structure as a plurality of currently displayed nodes in a format that enables navigation of said currently displayed nodes, including revealing said primary paths and concealing said secondary paths among said currently displayed nodes; and
    selectively revealing said secondary paths among said currently displayed nodes in response to identifying one of said multi-path nodes during said navigation of said currently displayed nodes, including revealing those secondary paths that extend from said identified multi-path nodes.

2. The method of claim 1 wherein said steps of displaying and selectively revealing include defining an idle state in which said secondary paths are concealed and an activate state in which selected said secondary paths are revealed, said activate state being triggered by identifying one of said multi-path nodes.

3. The method of claim 2 further comprising a step of remapping said tree structure subsequent to defining said tree structure in response to selecting to navigate one of said secondary paths, said remapping including mapping at least one of said currently displayed nodes to a displayed position that is indicative of a secondary parent-child relationship which includes said at least one currently displayed node, thereby forming a modified tree structure in which said currently displayed nodes are organized according to a combination of said primary and secondary paths.

4. The method of claim 3 wherein said step of remapping further includes unmapping said at least one currently displayed node from a position in said tree structure simultaneously with said mapping in order to form said modified tree structure, thereby defining a map/unmap state for navigation of said currently displayed nodes.

5. The method of claim 4 further comprising a reset step in which said mapping and unmapping are reversed to return said tree structure to a condition in which said currently displayed nodes are organized according to said primary paths, said reset step being executed following navigation of said at least one currently displayed node that was involved in said mapping and unmapping.

6. The method of claim 1 wherein said step of displaying includes presenting a hierarchical hyperbolic space.

7. The method of claim 1 wherein said step of providing data is implemented for nodes that represent documents of the World Wide Web.

8. The method of claim 1 wherein said step of providing data is implemented for nodes in a question-and-answer hierarchy.

9. The method of claim 1 further comprising steps of:
    compiling statistical usage data regarding accesses to said currently displayed nodes; and
    embedding said usage data into said displaying of said tree structure.

10. A method of enabling navigation through a plurality of nodes comprising steps of:
    displaying a plurality of visible nodes in an idle state within a currently active space in which each said visible node has a maximum of one primary parent linked to another said visible node by a primary path;
    concealing secondary paths among said visible nodes within said currently active space when said display is in said idle state, said secondary paths being links among said visible nodes having relationships that are not represented by said primary paths;

revealing selected secondary paths within said currently active space when said display is changed to an activate state by a selection of a visible hidden-link node having both a primary path and at least one secondary path to other visible nodes in said display;

remapping at least one said visible node to link to said visible hidden-link node when said display is changed from said activate state to a map state by selection of a secondary path for navigation;

navigating said at least one remapped visible node, thereby defining a navigation state; and resetting said display to show only said primary paths and to conceal said secondary paths in response to triggering a reset state following said step of navigating said at least one remapped visible node.

11. The method of claim 10 wherein said step of remapping includes unmapping said at least one visible node from connection via a primary parent.

12. The method of claim 10 wherein said step of displaying involves forming a hyperbolic space for a hierarchical tree structure.

13. The method of claim 12 wherein said step of remapping includes unmapping a visible parent node and its visible child nodes from being linked to said hierarchical tree structure via a primary path and further includes mapping said visible parent nodes and said visible child nodes to said hierarchical tree structure via a secondary path.

14. A system for navigating nodes comprising:

a data source having a stored tree structure of nodes organized according to primary paths that form tree links, said stored tree structure further having secondary paths among nodes, nodes having both primary and secondary paths being multi-path nodes;

a multi-path processor in communication with said data source for manipulating a visual display of currently displayed nodes within said tree structure, said multi-path processor being enabled to establish an idle state in which said primary paths are revealed and said secondary paths are concealed;

navigation means for selectively accessing said currently displayed nodes in said visual display, said multi-path processor being responsive to said navigation means to establish an activate state upon identification of one of said multi-path nodes of said currently displayed nodes, said activate state being one in which at least one secondary path is revealed; and remapper means connected to said multi-path processor for modifying said tree structure in response to an indication via said navigation means that secondary sub-tree nodes are to be accessed, said secondary sub-tree nodes being currently displayed nodes that are linked to said identified one of said multi-path nodes by one of said secondary paths, each of said secondary sub-tree nodes being uniquely associated with one of said currently displayed nodes, said modifying of said tree structure being in accordance with a relationship between said secondary sub-tree nodes and said identified one of said multi-path nodes.

15. The system of claim 14 wherein said remapper means includes an unmapper enabled to conceal linking of said secondary sub-tree nodes to said tree structure via a primary path when said tree structure is modified.

16. The system of claim 14 further comprising an examiner that is enabled to distinguish said multi-path nodes as said currently displayed nodes are accessed by said navigation means.

17. The system of claim 15 wherein said multi-path processor is configured to reset said tree structure to said idle state in response to termination of navigation of said secondary sub-tree nodes.

* * * * *